US007404540B2

United States Patent
Cocca et al.

(10) Patent No.: US 7,404,540 B2
(45) Date of Patent: Jul. 29, 2008

(54) PRIMARY POLE PIECE FOR A SOLENOID ACTUATOR

(75) Inventors: Joseph D. Cocca, Rochester, NY (US); Dwight H. Overmoyer, Rochester, NY (US); Thomas H. Lichti, Victor, NY (US); Jack E. Gerke, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 11/345,721

(22) Filed: Feb. 2, 2006

(65) Prior Publication Data

US 2007/0176134 A1    Aug. 2, 2007

(51) Int. Cl.
*F16K 31/02* (2006.01)
(52) U.S. Cl. .............. 251/129.15; 335/297; 123/568.26
(58) Field of Classification Search ............ 251/129.15; 335/296, 297; 123/568.21, 568.26
See application file for complete search history.

(56) References Cited

U.S. PATENT DOCUMENTS 5,481,236 A * 1/1996 Ruehle et al. ............... 335/126
5,599,003 A * 2/1997 Seemann et al. .......... 251/30.03
5,779,220 A * 7/1998 Nehl et al. ............. 251/129.15
6,467,959 B1 * 10/2002 Bircann ........................ 384/9

* cited by examiner

*Primary Examiner*—John K Fristoe, Jr.
(74) *Attorney, Agent, or Firm*—Paul L. Marshall

(57) ABSTRACT

A primary pole piece (PPP) for an electrical solenoid linear actuator includes an inner skirt portion extending axially from a radial flange portion and having a substantially uniform cylindrical thickness and a non-uniform axial length. The skirt is formed into a plurality of "saw teeth" or other axially-extending and circumferentially tapered elements separated by axially extending notches or similar axial inlets along the terminal skirt edge. Whereas in the prior art the magnetic flux is intensified radially by conical formation of the skirt, in the present invention the magnetic flux is intensified azimuthally by being collected in and directed to terminal flats of the saw teeth. The entire PPP may be net-formed by conventional powdered metal press/sintering, requiring no post-forming machining. Preferably, the molded PPP is conventionally sintered to increase density and is impregnated for plating.

5 Claims, 3 Drawing Sheets

PRIMARY POLE PIECE FOR A SOLENOID ACTUATOR

TECHNICAL FIELD

The present invention relates to electrical solenoid linear actuators; more particularly, to pole pieces for electrical solenoid linear actuators; and most particularly, to a primary pole piece for such an actuator wherein a skirt is of substantially uniform cylindrical thickness and non-uniform axial length.

BACKGROUND OF THE INVENTION

Solenoid linear actuators are well known for use in controlled linear displacement is of apparatus such as poppet valve stems. An exemplary use is in an exhaust gas recirculation valve (EGR valve) on an internal combustion engine.

In general construction terms, an insulated wire is wound in a plurality of turns (coil or windings) around a hollow cylindrical bobbin. A primary pole piece (PPP) includes a flange that extends across a first axial face of the bobbin and coil and also includes a first inner skirt extending axially into the bobbin hollow. A secondary pole piece (SPP) extends across a second and opposite axial face of the bobbin and coil and also includes a second skirt extending axially into the hollow toward the first skirt. The first and second skirts are separated by a calculated annular air gap, and the magnetic path between the PPP and the SPP typically is completed by a ferromagnetic housing around the windings. A ferromagnetic armature is slidably disposed within the cylindrical bobbin.

When current is passed through the windings, a toroidal magnetic field is created having axial field lines coincident with the axis of the bobbin and windings, which cause the armature to be urged axially of the windings. In a poppet valve application, the valve stem is attached to the armature and thus the valve head is urged into and out of closing contact with a valve seat in a valve body.

It is known in the prior art to conically taper the PPP inner skirt to provide a near-sharp terminal edge on the skirt at the air gap, the inner surface of the skirt being cylindrical and the outer surface being conical. The PPP acts as a flux carrier, and the flux path jumps the gap at the shaped edge. The conically tapered skirt both intensifies the flux density at the air gap and aids mechanically in guiding the armature as it slides in a thin stainless steel liner within the bobbin and windings.

In the prior art, an inexpensive means for forming solenoid components is powdered metal (PM) forming. Unfortunately, it has been found to be extremely difficult to form directly by PM a PPP conical skirt having a properly shaped edge. Further, density is sacrificed in taper wall design, and wall thickness is difficult to control. Near-sharp cones cannot be produced via PM process without secondary machining of an oversize PPP PM blank, resulting in increased manufacturing cost in time, apparatus, materials, and cleanup of machining waste. Further, the edge of a prior art near-sharp cone is easily damaged in handling before and during assembly into a solenoid actuator.

What is needed in the art is an improved solenoid primary pole piece that is net-size formed of powdered metal and thus requires no post-molding machining.

What is further needed in the art is an improved solenoid primary pole piece that is more rugged than a prior art conical pole piece and is not readily damaged during assembly of a solenoid actuator.

It is a primary object of the invention to reduce manufacturing cost and increase assembly reliability of a solenoid actuator.

SUMMARY OF THE INVENTION

Briefly described, a primary pole piece for an electrical solenoid linear actuator includes a skirt portion having a substantially uniform cylindrical thickness and a non-uniform axial length. The skirt is formed into a plurality of "saw teeth" or other axially-extending elements separated by axially extending notches or other such axial inlets along the terminal skirt edge. Whereas in the prior art the magnetic flux was intensified radially by conical formation of the skirt, in the present invention the magnetic flux is intensified azimuthally by being collected in, and directed to the tip regions of, the saw teeth. The entire PPP may be net-formed by conventional powdered metal press/sintering, requiring no post-forming machining. Preferably, the molded PPP is conventionally sintered to increase density and is impregnated for plating.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
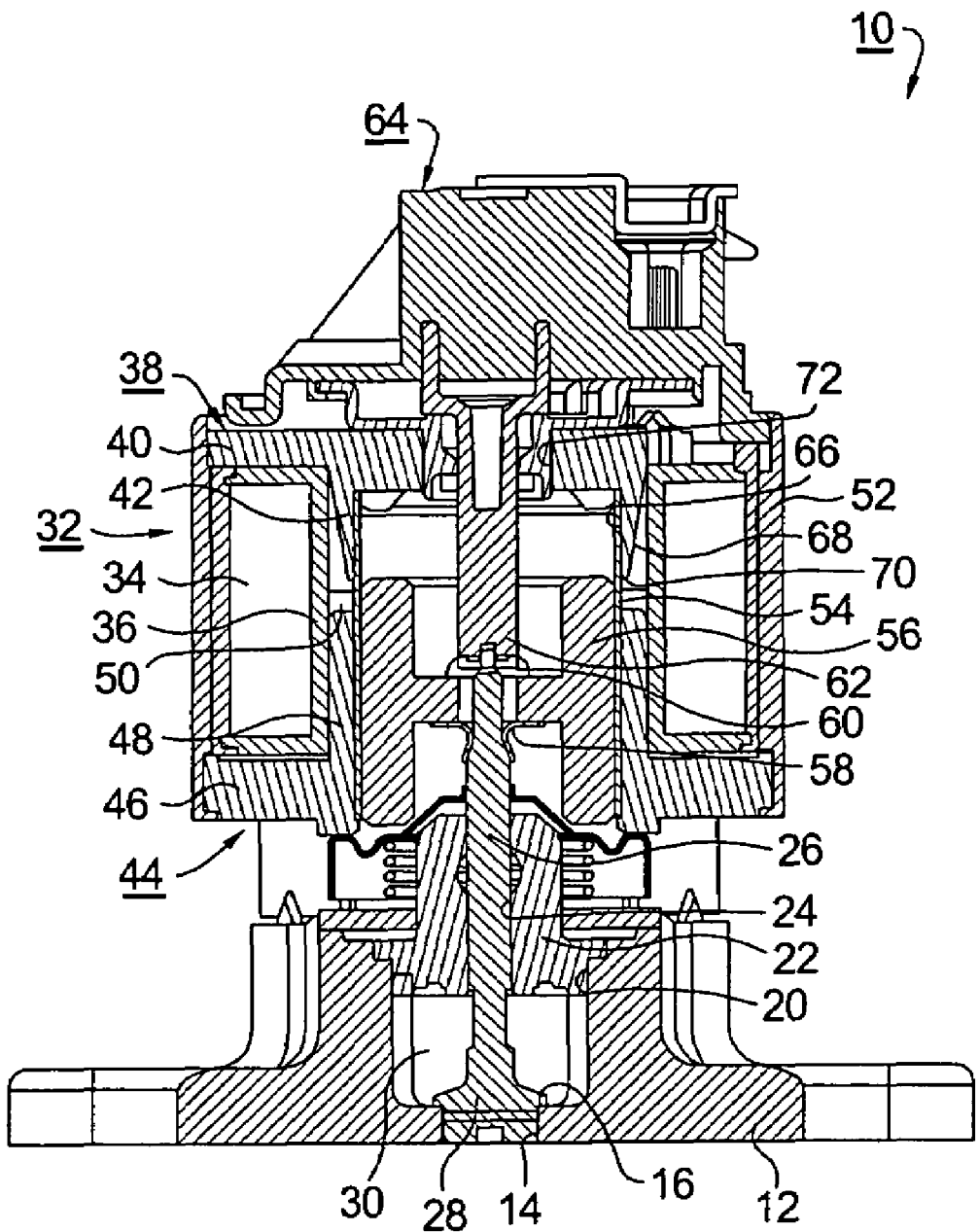
FIG. 1 is an elevational cross-sectional view of a poppet valve assembly, e.g. an EGR valve assembly, having a solenoid linear actuator comprising a prior art primary pole piece having a conical skirt.

Referring to FIG. 1, prior art poppet valve assembly 10 includes a valve body 12 having a first axial port 14 comprising a circular valve seat 16. A second axial port 20 is occupied by a valve bushing 22 having an axial bore 24 for guiding a valve stem 26 supporting a valve head 28 for mating with valve seat 16 in a chamber 30. A solenoid linear actuator 32 is mounted to valve body 12. Actuator 32 includes an electric coil 34 wound on a hollow bobbin 36. A prior art primary pole piece 38 includes a flange portion 40 and a PPP skirt portion 42 extending into bobbin 36. A secondary pole piece 44 includes a flange portion 46 and a SPP skirt portion 48 defining an air gap 50 between skirt portions 42,48. A ferromagnetic housing 52 surrounds the bobbin and completes the magnetic circuit of the solenoid. Within bobbin 36 is a thin stainless steel sleeve 54 and a ferromagnetic armature 56 axially slidable within sleeve 54. Armature 56 is attached via a retainer 58 to valve stem 26, and is also attached via a retaining nut 60 to an arm 62 of a valve position sensor assembly 64 mounted on actuator 32.

Prior art PPP skirt portion 42 has a cylindrical inner wall 66 and a tapered, conical outer wall 68, terminating in an edge 70, of uniform axial length from flange portion 40. An axial opening 72 in PPP 38 permits access of assembly 64 to armature 56.

Figure 2:
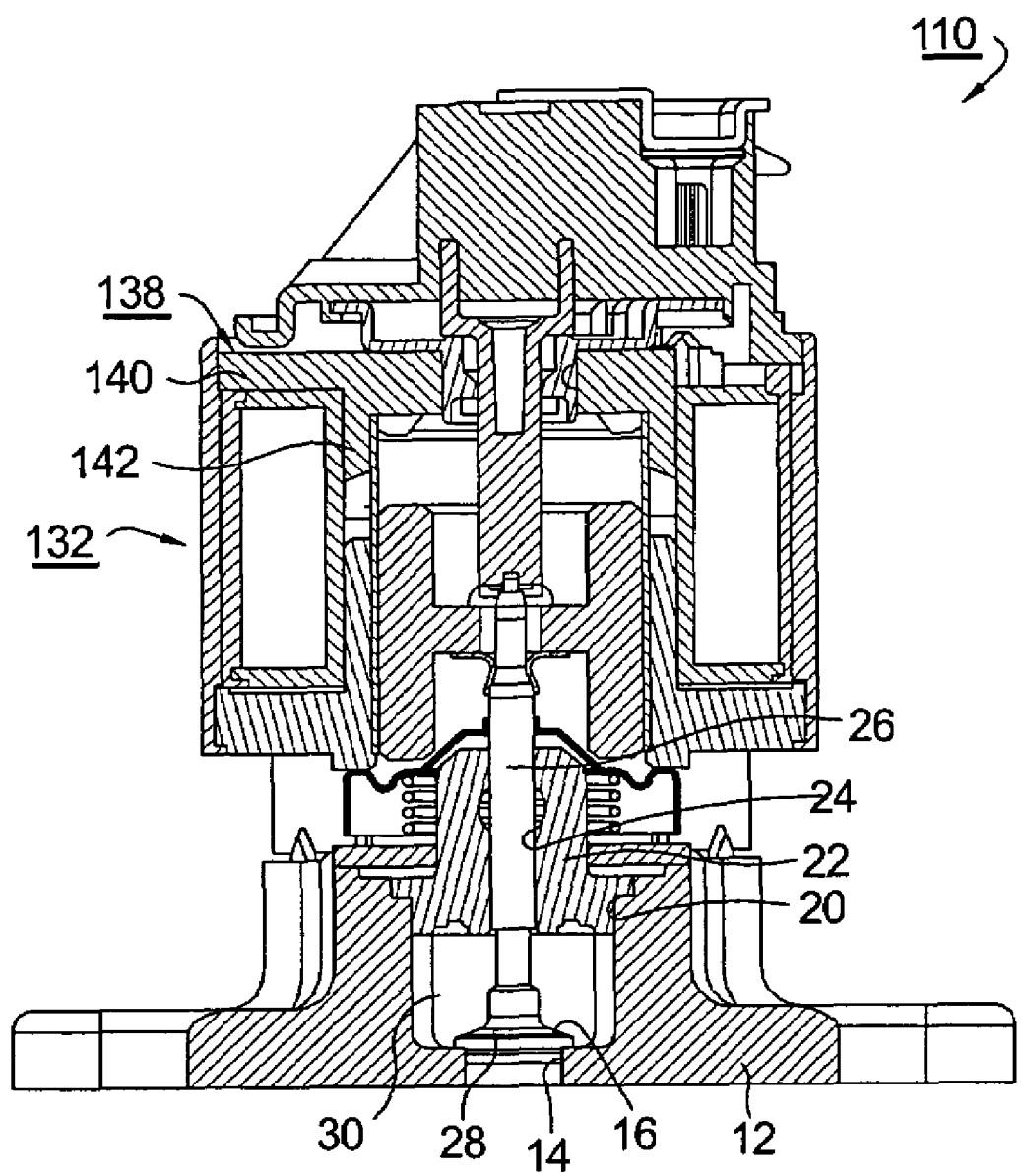
FIG. 2 is an elevational cross-sectional view of a poppet valve assembly similar to the prior art valve assembly shown in FIG. 1 but having a solenoid linear actuator comprising a primary pole piece in accordance with the invention.
Figure 4:
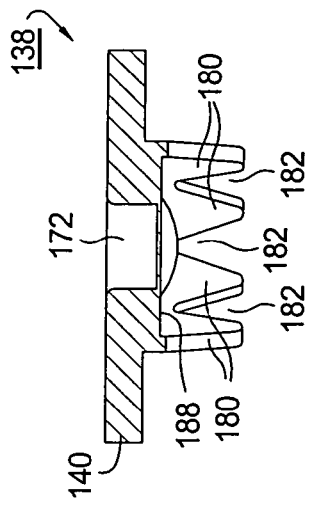
FIG. 4 is an elevational cross-sectional view taken along line 4-4 in FIG. 6.
Figure 6:
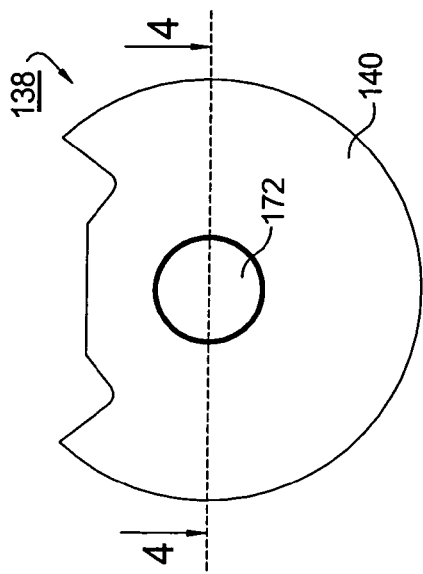
FIG. 6 is a plan view of a second side of the primary pole piece shown in FIG. 3.
Figure 3:
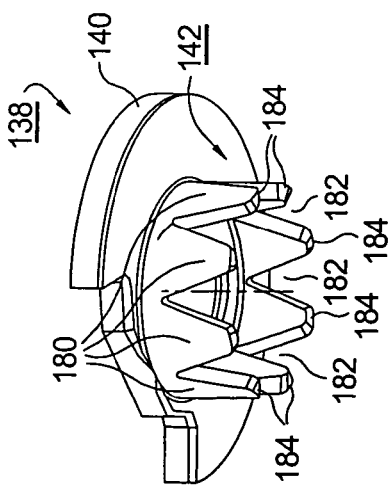
FIG. 3 is an isometric view from below of an exemplary primary pole piece in accordance with the invention.

Referring to FIG. 2, in an improved poppet valve assembly 110 the components just described for prior art poppet valve assembly 10 are substantially identical and where not indicated explicitly may be inferred from FIG. 1.

Improved poppet valve assembly 110 includes a valve body 12 having a first axial port 14 comprising a circular valve seat 16. A second axial port 20 is occupied by a valve bushing 22 having an axial bore 24 for guiding a valve stem 26 supporting a valve head 28 for mating with valve seat 16 in a chamber 30. An improved solenoid linear actuator 132 is mounted to valve body 12. Actuator 132 includes an electric coil 34 wound on a hollow bobbin 36.

The significant difference between prior art assembly 10 and improved assembly 110 lies in the form and fabrication of an improved primary pole piece 138, and especially in the form of improved primary pole piece skirt portion 142.

Referring now to FIGS. 2 through 6, improved PPP 138 is intended and suitable as a direct substitute for prior art PPP 38. Improved PPP 138 comprises a flange portion 140 and axial opening 172 substantially identical to prior art flange portion 40 and axial opening 72. Improved PPP skirt 142 comprises a plurality of axially-extending tapered elements 180 (also referred to herein generally as "saw teeth") separated by axially-extending notches 182 or other such axial inlets interrupting the terminal skirt edge such that improved skirt 142 is of non-uniform axial length from flange 140. Preferably, the inner wall 166 and the outer wall 168 are both cylindrical and coaxial such that saw teeth 180 are of constant radial thickness. Each of saw teeth 180 preferably does not terminate at a point but rather is finished in a near-sharp end defining a chamfered flat 184 from which magnetic flux lines (not shown) extend to skirt 48 of SPP 44. Preferably, the total mass of all saw teeth 180 is approximately the same as the total mass of prior art PPP skirt 42, and preferably the total surface area of flats 184 is approximately the same as the total surface area of prior art skirt end 70. Magnetic lines of flux (not shown) within PPP 138 are thus directed circumferentially to flats 184 and are thus concentrated azimuthally rather than radially as in prior art PPP 38. The performance of improved PPP 138, and hence of improved solenoid linear actuator 132, is equivalent to that of the prior art PPP 38 and solenoid actuator 32.

Figure 5:
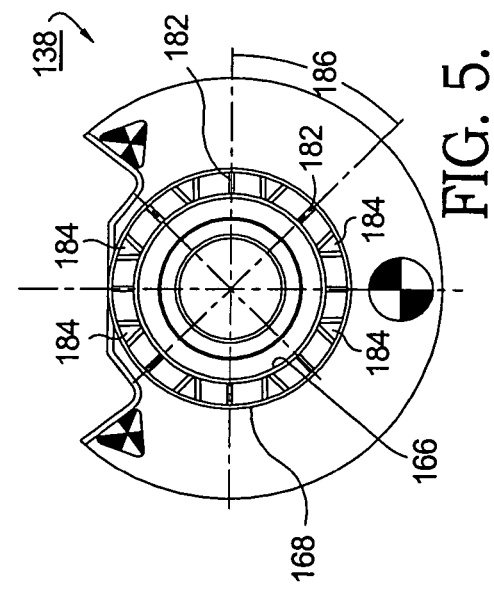
FIG. 5 is a plan view of a first side of the primary pole piece shown in FIG. 3.

A presently-preferred embodiment of improved PPP 138 comprises eight teeth 180 alternating with eight notches 182, the respective teeth 180 being tapered azimuthally and notches 182 being separated azimuthally by a pole piece internal angle 186 of 45° (FIG. 5).

Preferably, improved PPP 138 is provided with an axial spring in the form of a wave washer 188 disposed within the crown of teeth 180 as a shock-absorbing travel limiter for armature 56.

Improved PPP 138 may be readily formed by existing powered metal forming processes. The azimuthally tapered axially-extending elements 180 and concentric walls 166, 168 and uniform thickness of skirt 142 allows one-step molding of the PPP with no secondary machining, or machining waste to dispose of. Chamfered flats 184 are significantly less vulnerable to damage during assembly of the solenoid 132, and hence manufacturing cost is reduced by a) fewer handling and manufacturing steps, and b) less loss for damaged pole pieces.

As will be recognized by one of ordinary skill in the art, either or both of the primary and secondary pole pieces may be formed in accordance with the invention.

While the invention has been described by reference to various specific embodiments, it should be understood that the invention comprehends any and all pole piece skirt forms wherein the thickness of the skirt is varied azimuthally rather than radially, as in the prior art. Numerous changes may be made within the spirit and scope of the inventive concepts described, wherein the "teeth" and notches are not simply straight-sided forms having constant radial annular thickness. For example, either or both of the axially-extending elements and notches may be azimuthally curved in form, or "scalloped". Accordingly, it is intended that the invention not be limited to the described embodiments, but will have full scope defined by the language of the following claims.

What is claimed is:

1. A solenoid actuator comprising:
   a) a bobbin defining a hollow;
   b) a primary pole piece; and
   c) a secondary pole piece,
   wherein at least one of said primary and secondary pole pieces includes a radial flange portion and an inner skirt portion extending axially from said radial flange portion into said hollow, and
   wherein said inner skirt portion includes a plurality of axially-extending elements separated by axially-extending inlets interrupting the terminal edge of said inner skirt portion, such that said inner skirt portion is of non-uniform axial length from said radial flange portion.

2. A solenoid actuator in accordance with claim 1 wherein said axially-extending elements are azimuthally tapered.

3. A solenoid actuator in accordance with claim 1 wherein said axially-extending elements terminate in respective flats.

4. A poppet valve assembly comprising:
   a) a valve body including a valve seat;
   b) a valve stem extending into said valve body and supportive of a valve head for mating with said valve seat;
   c) an actuator operationally connected to said valve body and having an armature connected to said valve stem for linear actuation thereof,
   wherein said actuator includes a bobbin defining a hollow, a primary pole piece and a secondary pole piece, and
   wherein at least one of said primary and secondary pole pieces includes a radial flange portion and an inner skirt portion extending axially from said radial flange portion into said hollow, and
   wherein said inner skirt portion includes a plurality of axially-extending elements separated by axially-extending inlets interrupting the terminal edge of said inner skirt portion, such that said inner skirt portion is of non-uniform axial length from said radial flange portion.

5. A poppet valve assembly in accordance with claim 4 wherein said poppet valve assembly is an exhaust gas recirculation valve for use on an internal combustion engine.

* * * * *